(12) United States Patent
Taraz

(10) Patent No.: US 7,043,629 B1
(45) Date of Patent: May 9, 2006

(54) METHOD AND APPARATUS FOR MAINTAINING USER-DEFINED STATE INFORMATION DURING A REBOOT EVENT

(75) Inventor: Ramin Taraz, Lexington, MA (US)

(73) Assignee: Nortel Networks, Ltd., St. Laurent (CA)

( * ) Notice: Subject to any disclaimer, the term of this patent is extended or adjusted under 35 U.S.C. 154(b) by 501 days.

(21) Appl. No.: 10/317,164

(22) Filed: Dec. 11, 2002

(51) Int. Cl.
G06F 9/24 (2006.01)
G06F 9/445 (2006.01)

(52) U.S. Cl. .............................................. 713/1; 713/2
(58) Field of Classification Search ................ 713/1, 713/2; 707/104.1; 709/219; 370/264
See application file for complete search history.

(56) References Cited

U.S. PATENT DOCUMENTS 5,832,505 A * 11/1998 Kasso et al. ............. 707/104.1
6,012,088 A * 1/2000 Li et al. ...................... 709/219
6,446,203 B1 * 9/2002 Aguilar et al. .................. 713/2
6,563,800 B1 * 5/2003 Salo et al. ................... 370/264

* cited by examiner

Primary Examiner—Lynne H. Browne
Assistant Examiner—Stefan Stoynov
(74) Attorney, Agent, or Firm—John C. Gorecki

(57) ABSTRACT

A network device is able to selectively preserving or overwriting user-defined state information during a reboot event using intelligent scripts. In one embodiment, the network device is configured to run a script containing intelligence during a reboot event. The intelligence is able to ascertain the cause of the reboot event and use a script appropriate for the particular reboot event. Additionally, the network device, running the script, is able to ascertain whether any user-defined state information exists, whether that user-defined state information conflicts with any scripted state information, and how any conflict between the user-defined state information and the scripted state information should be resolved.

18 Claims, 3 Drawing Sheets

US 7,043,629 B1

METHOD AND APPARATUS FOR MAINTAINING USER-DEFINED STATE INFORMATION DURING A REBOOT EVENT

BACKGROUND OF THE INVENTION

1. Field of the Invention

The present invention relates to network devices and, more particularly, to enhancing the ability to configure a network device and maintain user-defined state information in a network device during a reboot event.

2. Description of the Related Art

Data communication networks may include various nodes, routers, switches, hubs, proxies, and other network devices coupled to and configured to pass data to one another. These devices will be referred to herein as "network devices." Data is communicated through the data communication network by passing data packets (or data cells or segments) between the network devices by utilizing one or more communication links between the devices. A particular packet may be handled by multiple network devices and cross multiple communication links as it travels between its source and its destination over the network.

Network devices are typically configured to transport data packets from one interface to another to facilitate delivery of packets or streams of data over a network. Network devices are not configured to process the data and/or alter the data within the packet or stream of data, except as necessary to make any required transportation decisions or perform functions related to packet transportation. In addition to packet transport functions, network devices may also perform additional network services, as discussed in greater detail below.

As data networks have grown in complexity and speed, the network devices used in those networks have likewise increased in complexity and speed. These advancements generally provide the user with options so that the user may customize the network device to operate in a manner consistent with administrative rules imposed on the network. Customer defined settings and other customer input configuration information will be referred to herein as user-defined state information. When a network device is rebooted, such as to upgrade the software running on the network device to add new features or to fix bugs in existing features, the reboot event or the new software version may cause the network device to lose some or all of this user-defined state information.

SUMMARY OF THE INVENTION

The present invention overcomes these and other drawbacks by providing an apparatus and method for selectively preserving user-defined state information during a reboot event. In one embodiment, the network device is configured to run a script containing intelligence during a reboot event. The intelligence is able to ascertain the cause of the reboot event and use a script appropriate for the particular reboot event. Additionally, the network device, running the script, is able to ascertain whether any user-defined state information exists, whether that user-defined state information conflicts with any scripted state information, and how any conflict between the user-defined state information and the scripted state information should be resolved.

The method and apparatus of the present invention enables a network device to preserve administrator approved configuration information during reboot events, such as restarts or upgrades, to minimize reconfiguration time following the reboot event. By preserving the configuration information, the network device may be upgraded to increase functionality while maintaining user-defined state information from the previous configuration. By enabling the administrator to approve user-defined state information, the administrator can reset undesirable user-defined settings that, while they may be possible from a network device standpoint, are undesirable from a network administrative viewpoint.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, the method and apparatus of the present invention enables a network device to preserve administrator approved configuration information during reboot events, such as restarts or upgrades, to minimize reconfiguration time following the reboot event. By preserving the configuration information, the network device may be upgraded to increase functionality while maintaining user-defined state information from the previous configuration. By enabling the administrator to approve user-defined state information, the administrator can reset undesirable user-defined settings that, while they may be possible from a network device standpoint, are undesirable from a network administrative viewpoint.

In one embodiment, the network device is configured to run a script anytime there is a reboot event, such as a restart, upgrade, or when the network device is turned on for the first time. This script contains intelligence to enable it to ascertain the type or model of the network device, whether the network device is being turned on for the first time or the likely cause of the reboot event. This intelligence is also capable of ascertaining whether there is any user-defined state, user-defined scripts, or other user-defined information that should be utilized during the reboot event. When such information is found, the intelligent script evaluates the information and selectively applies it during the reboot event to approximate the user-defined preferences where possible, consistent with network administrator preferences.

Figure 1:
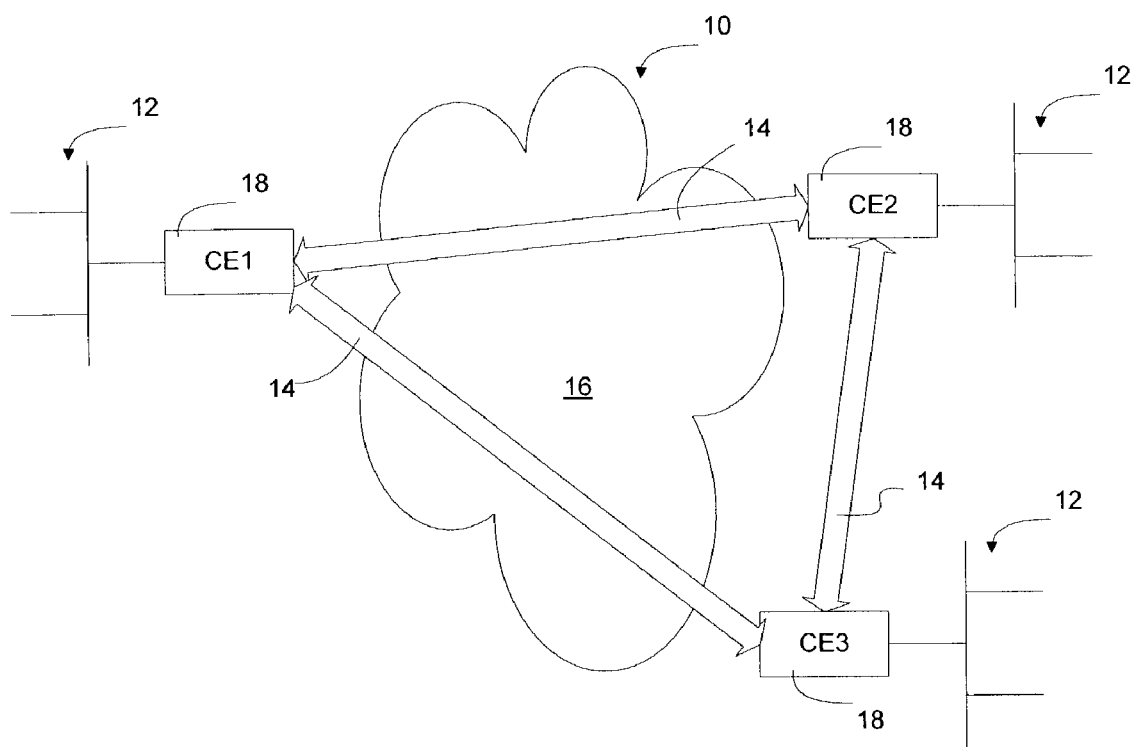
FIG. 1 is a functional block diagram of a network for use in accordance with an embodiment of the invention.

FIG. 1 illustrates a simplified example of a network for use in accordance with one embodiment of the invention. As shown in FIG. 1, a network 10 may include one or more local area networks 12 interconnected via VPN tunnels 14 through a public network 16 such as the Internet. Customer edge network devices 18 are configured to interconnect the LANs 12 with each other via VPN tunnels 14, and to connect the LANs 12 with the public network 16. The methods and apparatuses discussed below in connection with FIGS. 2–4 may be configured to operate on a network such as the one illustrated in FIG. 1, a sub-portion of such network, or a network with an entirely different topography. The invention is not limited to network devices configured to operate on the simplified example network illustrated in FIG. 1.

Figure 2:
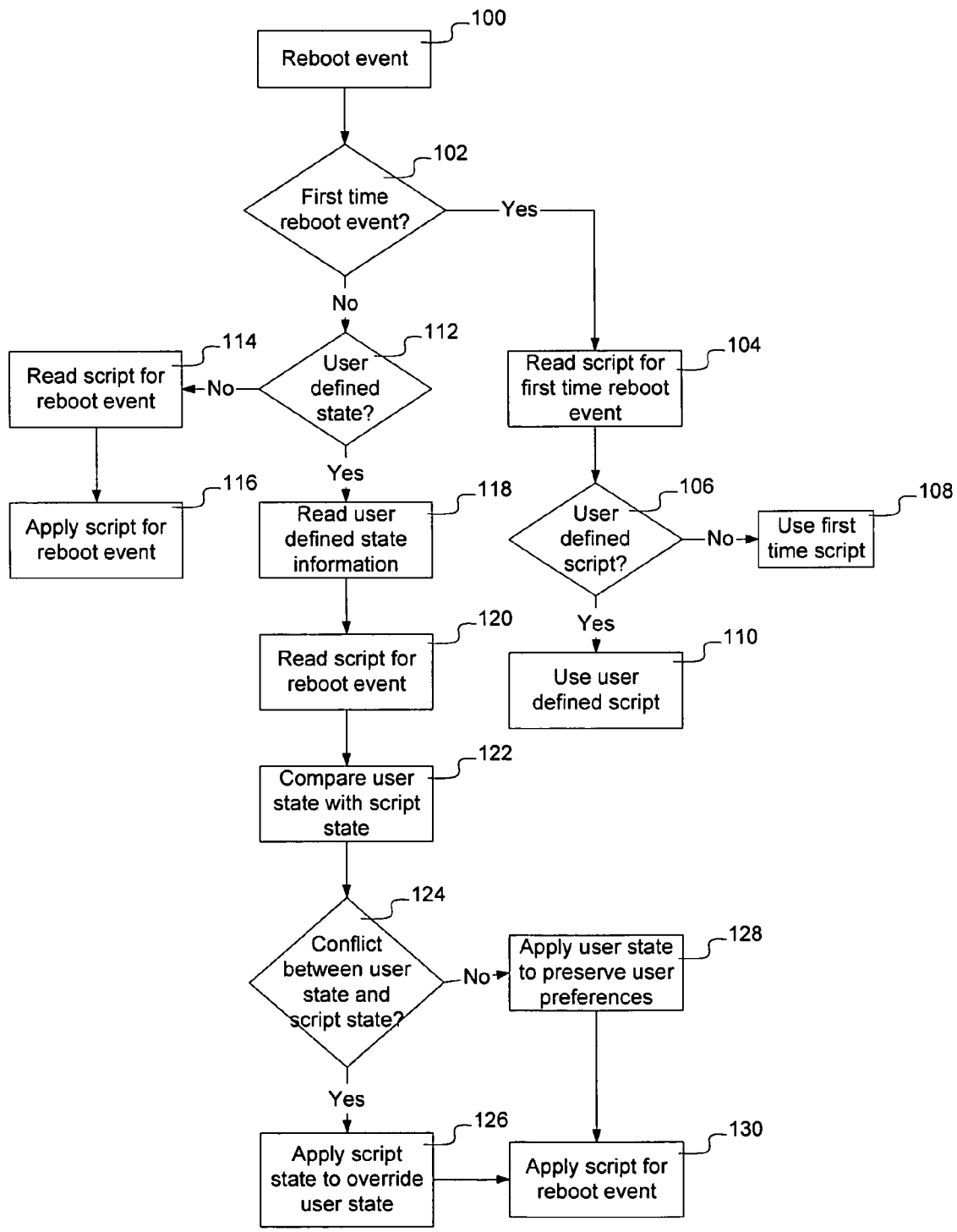
FIG. 2 is a flowchart of an example of software that can be used to implement one embodiment of the invention.

One example of software that may be used to implement an embodiment of the invention is set forth in FIG. 2. As illustrated in FIG. 2, upon occurrence of a reboot event 100, control logic of the network device first reads the script and ascertains the type or model of the network device to apply the correct portion of the script. The script then evaluates the network device to ascertain whether this is a first time reboot event 102, such as may occur when the network device is turned on for the first time. Determining whether the reboot event is a first time reboot event may be useful, for example, where a different portion of the script is used when the network device is first booted, to enable the network device to set up different parameters and functional units.

If the reboot event is a first time reboot event, the control logic reads the portion of the script for the first time reboot event 104. The control logic then determines if there is an user-defined script 106. If there is no user-defined script, the control logic will use the portion of the script for the first-time reboot event 108 during the reboot event to enable the network device to initialize the appropriate functional modules and otherwise bring the network device into an operational state.

If the control logic determines at 106 that there is an user-defined script, the control logic may use the user-defined script during the first time reboot event 110. The user-defined script may supplement or supplant the first time reboot event portion of the script, depending on the configuration of the network device. Enabling the network device to utilize a user-defined script during the initial boot event may be useful where the user is purchasing multiple network devices and wishes to have all the network devices configured, initially, in a particular manner. In this instance the user may define a script and cause it to be run during the initial boot so that the network device will be brought into an operational state with the appropriate features set as default states.

If the control logic determines, at 102, that this is not a first time reboot event, the control logic will next look to determine whether there is any user-defined state information that should be preserved during the reboot 112. If the control logic determines that there is no user-defined state information that should be preserved, it will read the portion of the script for the reboot event 114 and apply the script to bring the network device into an operational state. The script, in this instance, may be a standard script provided by the network device, or may be an user-defined script specially written and loaded onto the network device by the network administrator or other third party. Checking for user-defined state information enables the network device to preserve user-defined state information, if possible, and enables the network device to boot using the standard script where there is no user-defined state information.

If the control logic determines, in 112, that there is user-defined state information, the control logic will read the user-defined state information 118. The control logic will also read the portion of the script for the reboot event 120. The order in which the control logic reads the state information and the script may be swapped without departing from the invention. The script, in this instance, may be a standard script provided by the network device, or may be an user-defined script specially written and loaded onto the network device by the network administrator or other third party.

The control logic will then compare the user-defined state information with state information in the portion of the script to be used during the reboot event 122 and ascertain whether there is a conflict between the user-defined state information and the state information sought to be implemented by the script 124. State information included in the script will be referred to as "scripted state information."

Conflicts between the scripted state information and the user-defined state information may be resolved in a number of ways. Optionally, in one embodiment, the scripted state information may contain a tag or other permanence indicator relating to how conflicts should be resolved between the user-defined state information and scripted state information. Specifically, providing permanence indicators associated with state values in the scripted state information will enable the administrator to specify a portion of the scripted state information as "default" state information and another portion of the scripted state information as "fixed" state information. Conflict resolution between the scripted state information and the user-defined state information can then use the permanence indicators to determine which state information should prevail in the event of a conflict.

For example, if the permanence indicator associated with an item of scripted state information is set to "fixed," the control logic will apply the scripted state value during the reboot event, even if the user has defined another value for that item. If the permanence indicator associated with the item of scripted state information is set to "default," the conflict resolution procedure will select any user-defined value for that piece of state information. If there is no corresponding user-defined state information, the script will select the default value from the scripted state information.

Accordingly, in this embodiment, the network administrator may lock certain portions of the network device state information so that the network device always is always configured in a particular manner, regardless of the last configuration of the network device or any other user-defined state information. This is useful, for example, as it allows the network administrator to reset undesirable settings in the network device simply by causing a restart event to be initiated on the network device.

As shown in FIG. 2, if there is a conflict between the user-defined state information and the scripted stated information that requires the user-defined script information to be partially or wholly overwritten, the control logic will use the scripted state information 126 and will ignore all or the conflicting portion of the user-defined state information. If there is no conflict, the control logic will use the user-defined state information 128. In either instance, the control logic will then apply the script during the machine reboot 130.

Figure 3:
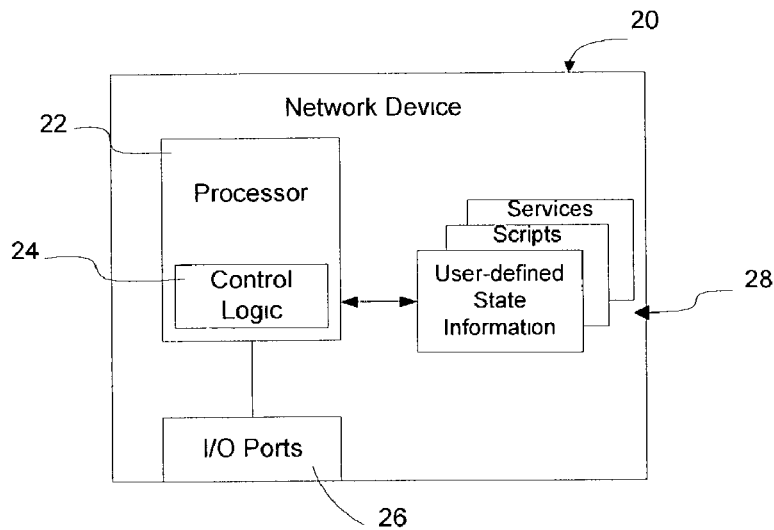
FIG. 3 is a functional block diagram of a network device according to an embodiment of the invention.

FIG. 3 illustrates a functional block diagram of a network device configured to operate in accordance with aspects of the present invention. The network device of FIG. 3 may be used, for example, as a customer edge network device (CE1, CE2, or CE3 in FIG. 1), or at any other place on the LANs 12 or the public network 16.

As shown in FIG. 3, a network device 20 includes a processor 22 and control logic 24 configured to implement the functions associated with the network device 20. One or more I/O ports 26 are provided to enable the network device 20 to send and receive signals from the network. In the illustrated embodiment only one set of I/O ports has been illustrated to prevent obfuscation of the inventive aspects of the invention. The invention is not limited to a network device having a single I/O port or a single set of I/O ports, as a network device may have any number of I/O ports.

The network device also has one or more memories 28 configured to store script information containing one or more scripts or instructions derived from scripts for use during reboot events. The memory may also include user-defined state information. User-defined state information will be discussed in greater detail in connection with FIG. 4, but in general includes any information input or derived from user input as to how the network device should be configured for operation. The memory may also contain instructions regarding one or more network services to be performed by the network device. These network services will be discussed in greater detail in connection with FIG. 4.

Figure 4:
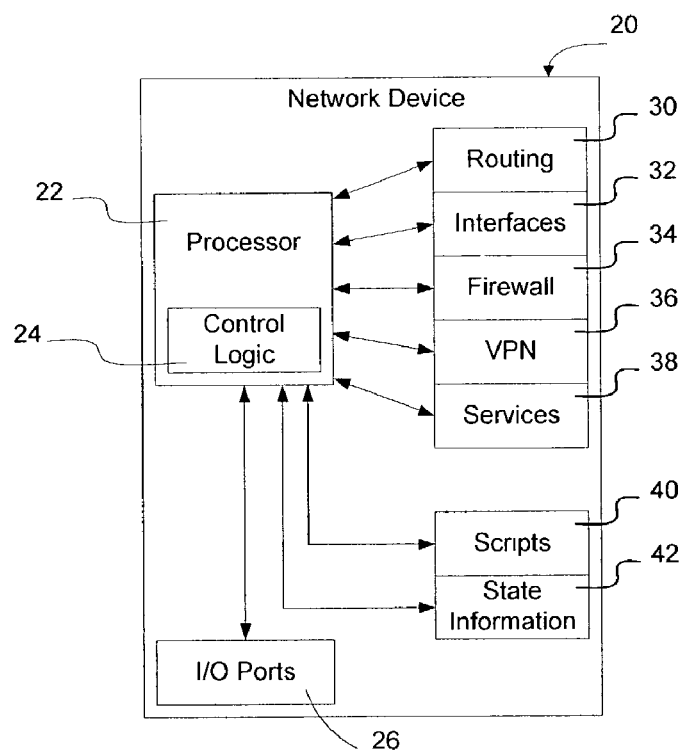
FIG. 4 is a functional block diagram of a network device according to another embodiment of the invention.

As shown in FIG. 4, a network device according to one embodiment of the invention may have multiple aspects that may be customized by the user to enable the network device to operate within the user's network. For example, as shown in FIG. 3, the network device 20 may contain one or more functional modules, either implemented as software instructions stored in memory 28 or implemented as hardware. The physical embodiment of the functional modules is discussed in greater detail below. These functional modules may enable the network device to perform routing functions, interface with different types of networks, perform firewall functions, and perform various network services. Additional or alternative functional modules may be implemented in the network device as well, and the invention is not limited to these specific illustrated functional modules. In operation, there may be thousands or more variables and options that may be set by the user in connection with the functions and network services to be performed by the network device that will enable the network device to operate as desired in the user's network.

In the embodiment shown in FIG. 4, the network device contains a routing module 30 configured to enable the network device to perform routing functions. This may be implemented in a number of different conventional manners, such as by implementing a protocol stack to enable the network device to communicate with other routers or network devices using standard routing protocols such as Open Shortest Path First (OSPF), Routing Information Protocol (RIP), or Border Gateway Protocol (BGP). While these three routing protocols have been specifically mentioned as examples of routing protocols that may be implemented on the network device, the invention is not limited to a network device that implements only one or more of these routing protocols.

The network device may also contain an interface functional module 32 to enable it to interface with different types of networks. For example, the network device may be configured to enable it to communicate with other network devices over an Ethernet network, Frame Relay network, X.25 network, V.35 network, or any other type of network. The invention is not limited to a network device configured to communicate via one or more of these listed networks, but rather may be used on any network.

The network device may contain a functional module to enable it to perform firewall functions. Some sample functions performed by firewalls include implementing filters, applying policies to the filters, and performing Network Address Translation (NAT). These firewall features enable the network device to screen a private side of a network from a public side of the network, for example at an interface between a LAN and the Internet, and protect sensitive information on the private side of the network from being visible to the public side of the network. For example, in the network illustrated in FIG. 1, implementing a firewall in one or more of the customer edge network devices 18 would enable private information on the LANs 12 to be screened from the public network 16, while enabling the private information to be shared over the VPN tunnels 14.

The network device may also include a VPN server 36 configured to enable the network device to establish, participate in establishing, and maintain VPN tunnels through the public network to other network devices. VPN tunnels are used in many instances to securely interconnect two or more LANs over a public network, or to securely connect a personal computer (PC) at a remote location with a LAN at another location via one or more public networks. VPN tunnels are useful in this instance as they are able to provide for the secure intercommunication of private data over a public network without exposing that data to the public network. VPN tunnels may be formed via encryption, encapsulation, or both, or in any other conventional manner, and the invention is not limited to any particular manner of establishing the VPN tunnels.

The network device may also contain a services module 38 configured to enable the network device to perform one or more services on the network. Services are different than the network device functions described above, as network services are performed on behalf of other network devices, whereas network device functions are performed on behalf of the network device itself. Stated differently, network device functions are used by the network device to enable the network device to perform its functions associated with packet transport, whereas network services are performed by the network device on behalf of other network devices or the network itself, to enhance the functionality of the network as a whole.

In one embodiment, the network device may perform network services such as hosting one or more network servers. For example, the network device may host a Dynamic Host Configuration Protocol (DHCP) server to enable it to be used to assign IP addresses to other network devices or resources on the network. The network device may also include a Domain Name Server (DNS) to enable it to resolve domain name queries from resources on the network. The network device may include a Telnet server to enable it to communicate via Telnet with other network devices on the network. Additionally, the network device may include an accounting module to enable it to perform accounting services, such as to enable use-based or flat fee billing for use of network resources.

In addition to being configured to perform network device functions and network services, the network devices of FIGS. 3 and 4 also includes a functional module or memory configured to store script information 40. Scripts are commonly used to cause the network processor or other control logic to execute a series of instructions during a reboot event of the network device.

According to one embodiment of the invention, the script used to initiate a restart operation in the network device utilizes intelligence to ascertain whether the network device contains user-defined state information. Using this capability, the script is able to cause the network device to maintain, if desired, the user-defined state information. Alternatively or additionally, the script can reinstall administrator preferences on the network device even where an user may have altered the configuration prior to the last reboot. This ability to reinstall or reinitiate administrator preferences may prevent user modifications from remaining on the network for extended periods of time, thus enhancing network security. For example, assume that a user has altered a network device in a manner that may compromise the security of the network, such as by altering the characteristics of a firewall. A security breach of this nature may be detected, corrected, and optionally reported by simply causing the network device to undergo a reboot event, e.g. a restart.

The method described in connection with FIG. 2 may be implemented as software configured to be executed on the control logic 24 of network device 20. Specifically, the software of FIG. 2 may be implemented as a set of program instructions that are stored in the computer readable memory 28 within the network device 20 and executed on a microprocessor 22 within the network device 20. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of maintaining user-defined state information during a reboot event in a network device, said network device comprising at least one of a router and a switch, the method comprising the steps of:

running a reboot event script on the network device, the reboot event script containing intelligence enabling the script to ascertain a nature of the reboot event;

selectively applying a portion of the reboot event script according to the ascertained nature of the reboot event; and selectively preserving at least a portion of the user-defined state information during the reboot event, said user-defined state information comprising customer defined settings and customer input configuration information, wherein the reboot event script contains scripted state information, and wherein the step of selectively preserving at least a portion of the user-defined state information includes detecting a conflict between the scripted state information and the user-defined state information.

2. The method of claim 1, wherein the scripted state information contains permanence indicators associated with items of the scripted state information, and wherein the step of selectively preserving at least a portion of the user-defined state information includes applying the permanence indicators to ascertain whether at least one of the items of user-defined state information should be preserved.

3. The method of claim 2, wherein the method further comprises the step of generating a report where the at least one of the items of user-defined state information is not preserved.

4. The method of claim 1, further comprising the steps of:
reading an user-defined script, and at least one of:
supplementing the reboot event script with the user-defined script; and
supplanting the reboot event script with the user-defined script.

5. The method of claim 1, wherein the user-defined state information contains settings for the network device to enable the network device to perform network services.

6. The method of claim 5, wherein the network services include at least one of:
hosting a Dynamic Host Configuration Protocol (DHCP) server to enable the network device to be used to assign UP addresses to other network devices or resources on a communication network;
hosting a Domain Name Server (DNS) to enable the network device to resolve domain name queries from the other network devices or the resources on the communication network;
hosting a Telnet server; and
hosting an accounting module to enable the network device to perform accounting services for the other network devices on the communication network.

7. The method of claim 1, wherein the user-defined state information contains settings for the network device to enable the network device to perform routing functions.

8. The network device of claim 1, wherein the user-defined state information contains settings for the network device to enable the network device to function as a VPN server.

9. A network device, comprising:
control logic implemented on a tangible computer readable medium containing program instructions configured to:
run a reboot event script on the network device, the reboot event script containing intelligence enabling the script to ascertain a nature of the reboot event;
selectively apply a portion of the reboot event script according to the ascertained nature of the reboot event; and
selectively preserve at least a portion of a user-defined state information during the reboot event; and
wherein the network device is at least one of a router and a switch, wherein the reboot event script contains scripted state information, and wherein the control logic selectively preserves at least a portion of the user-defined state information by detecting a conflict between the scripted state information and the user-defined state information.

10. The network device of claim 9, further comprising a routing module.

11. The network device of claim 9, further comprising a VPN server.

12. The network device of claim 9, further comprising a network services functional module configured to perform network services for at least one of another network device and a communication network.

13. The network device of claim 12, wherein the network device includes at least one of:

a Dynamic Host Configuration Protocol (DHCP) server to enable the network device to be used to assign IP addresses to other network devices or resources on the communication network;

a Domain Name Server (DNS) to enable the network device to resolve domain name queries from the other network devices or the resources on the network;

a Telnet server; and an accounting module to enable the network device to perform accounting services for the other network device or for the communication network.

14. The network device of claim 9, wherein the scripted state information contains permanence indicators associated with items of the scripted state information, and wherein the control logic selectively preserves at least a portion of the user-defined state information by applying the permanence indicators to ascertain whether at least one of the items of user-defined state information should be preserved.

15. The network device of claim 14, wherein the control logic is further configured to generate a report where the at least one of the items of user-defined state information is not preserved.

16. The network device of claim 9, wherein the control logic is further configured to:

read an user-defined script, and at least one of:

supplement the reboot event script with the user-defined script; and supplant the reboot event script with the user-defined script.

17. A network device, comprising:

means for running a reboot script during a reboot event, said reboot script containing scripted state information;

means for ascertaining user-defined state information of the network device;

means for detecting a conflict between the scripted state information and the user-defined state information; and means for resolving the conflict between the scripted state information and the user-defined state information by selectively preserving at least a portion of the user-defined state information; and wherein the network device is at least one of a router and a switch.

18. The network device of claim 17, further comprising means for performing network services.

* * * * *